United States Patent
Sun et al.

(10) Patent No.: US 9,740,366 B2
(45) Date of Patent: Aug. 22, 2017

(54) METHOD AND DEVICE FOR CONFIGURING MOBILE TERMINAL ICONS

(71) Applicant: ZTE Corporation, Shenzhen (CN)

(72) Inventors: Yulong Sun, Shenzhen (CN); Wei Wang, Shenzhen (CN); Wei Liu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 14/917,979

(22) PCT Filed: Nov. 1, 2013

(86) PCT No.: PCT/CN2013/086442
§ 371 (c)(1),
(2) Date: Mar. 10, 2016

(87) PCT Pub. No.: WO2014/169613
PCT Pub. Date: Oct. 23, 2014

(65) Prior Publication Data
US 2016/0224206 A1    Aug. 4, 2016

(30) Foreign Application Priority Data

Sep. 10, 2013  (CN) .......................... 2013 1 0429604

(51) Int. Cl.
G06F 3/048      (2013.01)
G06F 3/0481     (2013.01)
G06F 9/445      (2006.01)
G06F 9/44       (2006.01)
G06F 17/21      (2006.01)

(52) U.S. Cl.
CPC .......... *G06F 3/04817* (2013.01); *G06F 3/048* (2013.01); *G06F 9/445* (2013.01); *G06F 9/4443* (2013.01); *G06F 17/218* (2013.01)

(58) Field of Classification Search
CPC ..................................................... G06F 3/0481
See application file for complete search history.

(56) References Cited

U.S. PATENT DOCUMENTS

| 2010/0058182 | A1  | 3/2010 | Jung |
| 2010/0241955 | A1* | 9/2010 | Price ..................... G06F 3/0425 715/702 |
| 2011/0181520 | A1  | 7/2011 | Boda et al. |

FOREIGN PATENT DOCUMENTS

| CN | 101211250 A | 7/2008 |
| CN | 103019519 A | 4/2013 |
| CN | 103092469 A | 5/2013 |
| CN | 103226473 A | 7/2013 |

OTHER PUBLICATIONS

PCT International Search Report for PCT/CN2013/086442 mailed May 28, 2014 (5 pages).
European Supplementary Search Report for EP Application No. 13882571.6 mailed May 4, 2016 (7 pages).

* cited by examiner

*Primary Examiner* — Peiyong Weng
(74) *Attorney, Agent, or Firm* — Eversheds Sutherland (US) LLP (57) ABSTRACT

Disclosed are a method and a device for setting icons of a mobile terminal. The method includes: selecting icons to be overlapped and displaying the icons according to a preset ordering rule; setting tags for the icons to be overlapped which have been reordered; and generating a new icon and displaying or hiding the tags around the new icon.

20 Claims, 8 Drawing Sheets

METHOD AND DEVICE FOR CONFIGURING MOBILE TERMINAL ICONS

CROSS REFERENCES TO RELATED APPLICATIONS

This application claims the priority benefit of PCT/CN2013/086442 filed on Nov. 1, 2013 and Chinese Application No. 201310429604.3 filed on Sep. 10, 2013. The contents of these applications are hereby incorporated by reference in their entirety.

TECHNICAL FIELD

The present document relates to the application technical field of icons of a mobile terminal, and in particular, to a method and a device for setting icons of a mobile terminal.

BACKGROUND

With the step-by-step improvement of the mobile terminal operating system, user's demand on application software which can run on the mobile terminal are growing exponentially. The number of the application software on the internet which are provided for users to download is increasing by the day, and the mobile terminal users install a lot of application software in the mobile equipments to meets different demands.

As the number of installed application programs is increasing, and accordingly, application software icons of the mobile terminal are increasing. Therefore, two problems occur in practical application: one is how to find the icon of a required application in a large number of icons quickly and exactly; the other is how to display more icons in a limited screen space of the mobile terminal.

SUMMARY

The embodiment of the present document provides a method and a device for setting icons of a mobile terminal to solve the technical problems of finding an application icon quickly and exactly and placing more icons in a limited screen space.

The embodiment of the present document provides a method for setting icons of a mobile terminal, comprising:

selecting icons to be overlapped and arranging and displaying the icons to be overlapped according to a predetermined ordering rule;

setting tags for the icons to be overlapped which have been reordered and displayed; and generating a new icon and displaying or hiding the tags around the new icon.

Alternatively, said selecting icons to be overlapped comprises: selecting the icons to be overlapped by clicking and/or by box selection.

Alternatively, when the icons to be overlapped are selected only by clicking, the predetermined ordering rule is an order of selecting the icons by clicking;

when the icons to be overlapped are selected only by box selection, the predetermined ordering rule is that a left side of icons selected by box selection is prior to a right side, an upper side is prior to a lower side; or when selecting by clicking and selecting by box selection exist at the same time, the predetermined ordering rule is: within selecting modes, the icons are arranged according to respective predetermined ordering rules of the selecting modes; between the selecting modes, the icons are arranged according to an order of the selecting modes.

Alternatively, said setting tags for the icons to be overlapped which have been reordered and displayed comprises:

setting a default tag for a first icon of the icons to be overlapped;

setting tags of middle icons according to an arranging order of icons; and setting a tag of a last icon by default according to a last tag of the middle icons.

Alternatively, said setting tags for the icons to be overlapped which have been reordered and displayed comprises:

canceling setting of the tag by means of clicking the tags of the middle icons, making a corresponding modification to a tag next to the canceled tag.

Alternatively, the tags can be letters, numbers or graphics, and the tags are used to space the icons to be overlapped which have been reordered and displayed.

Alternatively, the generated new icon is any one of a preset icon or a user-defined icon.

Alternatively, said displaying the tags around the new icon comprises:

taking a specified location as a start point, arranging the tags clockwise or anticlockwise around the generated new icon uniformly.

Alternatively, the method further comprises: when the tags are displayed around the new icon, clicking any two tags of the tags;

generating an indication flag according to a space location where the new icon is located; and after clicking or dragging the indication flag, displaying all icons between the selected two tags.

Alternatively, the method further comprises: when the tags are hidden around the new icon, after clicking the new icon, displaying the tags around the new icon;

clicking any two tags of the tags;

generating an indication flag according to a space location where the new icon is located; and after clicking or dragging the indication flag, displaying all icons between the selected two tags.

Alternatively, said displaying the tags around the new icon comprises:

taking a specified location as a start point, arranging the tags clockwise or anticlockwise around the generated new icon uniformly, then displaying the tags around the generated new icon.

Alternatively, said after clicking or dragging the indication flag, displaying all icons between the selected two tags comprises:

After clicking or dragging the indication flag, displaying all icons or displaying overlapped icons according to the number of icons between two tags and the size of a space in the direction of an indication flag.

The embodiment of the present document further provides a device for setting icons of a mobile terminal, comprising:

an icon selecting module, configured to select icons to be overlapped, arrange and display the icons to be overlapped according to a predetermined ordering rule;

a tag setting module, configured to set tags for the icons to be overlapped which have been reordered and displayed; and an icon displaying module, configured to generate a new icon and display or hide the tags around the new icon.

Alternatively, the icon selecting module comprises:

a selection submodule, configured to select the icons to be overlapped by clicking or by box selection; and an ordering submodule, configured to arrange and display the icons to be overlapped according to the predetermined ordering rule;

Alternatively, the tag setting module comprises:

a tag presetting submodule, configured to set a default tag for a first icon of the icons to be overlapped;

a tag inserting submodule, configured to set tags for middle icons according to an arranging order of the icons;

a tag default submodule, configured to set a tag of a last icon by default according to a last tag of the middle icons;

a tag canceling submodule, configured to cancel setting of the tag by means of clicking the tags of the middle icons; and a tag adjustment submodule, configured to make a corresponding modification to a tag next to the canceled tag.

Alternatively, the icon displaying module comprises:

an icon generating submodule, configured to generate a new icon; and a displaying submodule or a hiding submodule, wherein the displaying submodule is configured to display the tags around the new icon; the hiding module is configured to hide the tags around the new icon.

Alternatively, when the icon displaying module comprises the displaying submodule, the displaying submodule comprises:

a first receiving submodule, configured to receive clicking information for the tags in the displaying submodule;

a first determining submodule, configured to select and click any two tags of the tags in the displaying submodule; and a first indication submodule, configured to generate an indication flag according to a space location where the new icon is located.

Alternatively, when the icon displaying module comprises the hiding submodule, the hiding submodule comprises:

a second receiving submodule, configured to receive clicking for the new icon and display the tags around the new icon;

a second determining submodule, configured to select and click any two tags of the tags in the second receiving submodule; and a second indication submodule, configured to generate an indication flag according to a space location where the new icon is located.

Alternatively, the displaying submodule further comprises: an application submodule, configured to receive a clicking operation for the indication flag in the first indication submodule, and display all icons or display overlapped icons between any two tags in the first determining submodule; and the hiding submodule further comprises: an application submodule, configured to receive a clicking operation for the indication flag in the second indication submodule, and display all icons or display overlapped icons between any two tags in the second determining submodule.

Thus, in the embodiments of the present document, the technical problems of finding the application icon quickly and placing more icons in the limited screen space are solved by a technical scheme of selecting icons to be overlapped, arranging and displaying the icons to be selected according to a predetermined ordering rule, setting tags for them and generating a new icon. Therefore, it makes the operation of user finding icons more convenient, and it makes more icons to be placed in the limited screen space of the mobile terminal.

PREFERRED EMBODIMENTS OF THE INVENTION

The embodiments of the present document will be described in detail in conjunction with accompanying drawings hereinafter. It should be illustrated that without conflict, the embodiments in the application and the features of the embodiments can be randomly combined with each other.

Embodiment 1

Figure 1:
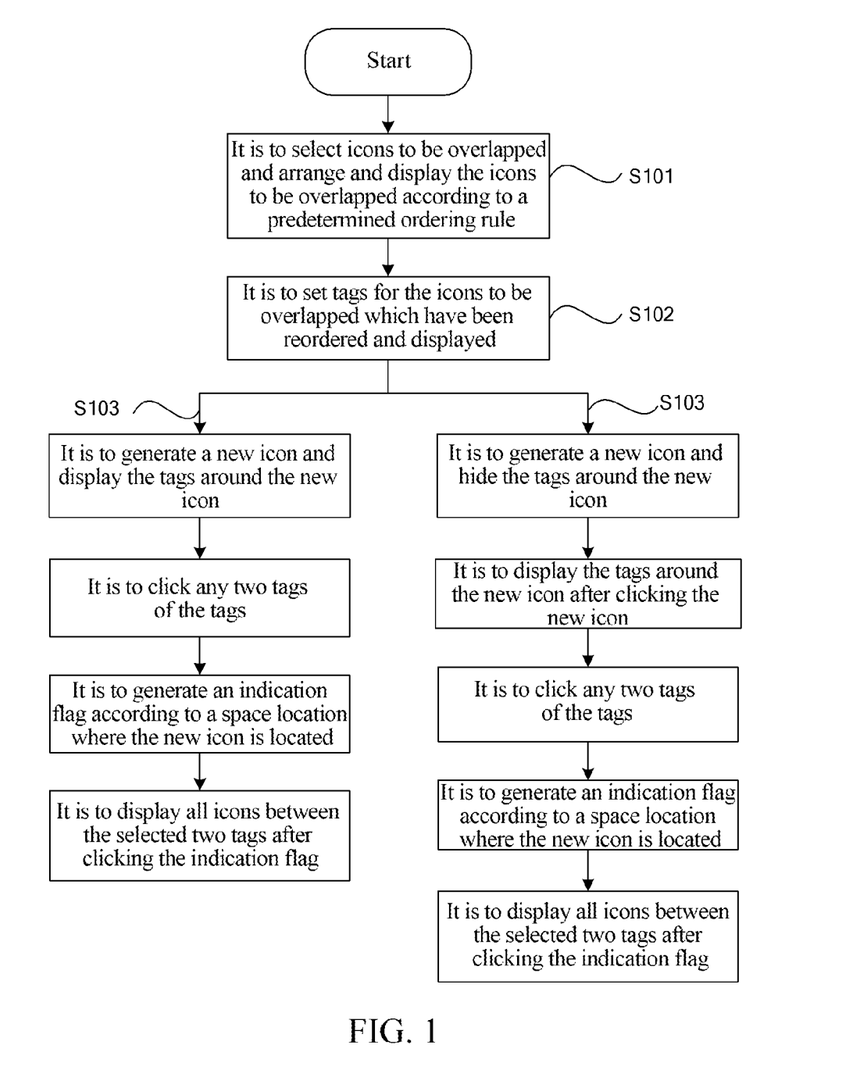
FIG. 1 is a flow chart of a method for setting icons of a mobile terminal according to the embodiment of the present document.

FIG. 1 is a flow chart of a method for setting icons of a mobile terminal according to the embodiment 1 of the present document, and the method comprises the following steps.

In step S101, it is to select icons to be overlapped, arrange and display the icons to be overlapped according to a predetermined ordering rule.

Figure 2:
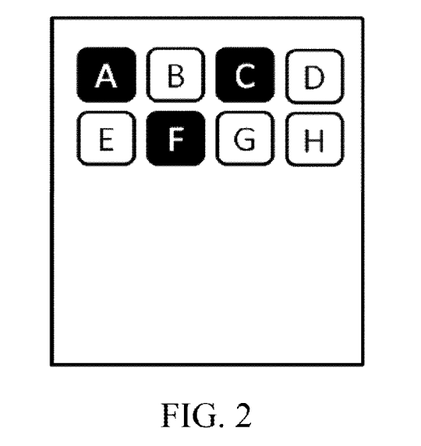
FIG. 2 is a schematic diagram of an interface for selecting icons to be overlapped by clicking according to the embodiment of the present document.
Figure 3:
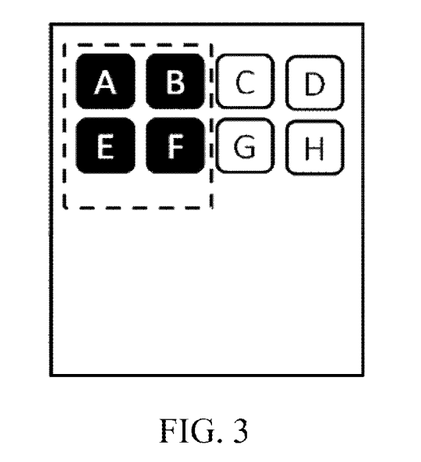
FIG. 3 is a schematic diagram of an interface for selecting icons to be overlapped by box selection according to the embodiment of the present document.

When the icons to be overlapped are selected only by clicking, the predetermined ordering rule is an order of selecting the icons by clicking; when the icons to be overlapped are selected only by box selection, the predetermined ordering rule is that a left side of the icons selected by box selection is prior to a right side, an upper side is prior to a lower side; when selecting by clicking and selecting by box selection exist at the same time, the predetermined ordering rule is: within selecting modes, the icons are arranged according to respective predetermined ordering rules of the selecting modes; between the selecting modes, the icons are arranged according to an order of the selecting modes. As shown in FIG. 2 and FIG. 3, when the icons to be overlapped are selected only by clicking, it is to click icons A, F, C in sequence, an order of the icons to be overlapped which have been reordered and displayed is AFC; when the icons to be overlapped are selected only by box selection, icons A, B, E and F are selected by box selection, an order of the icons to be overlapped which have been reordered and displayed is ABEF. When selecting by clicking and selecting by box selection exist at the same time, if icon A is first selected by clicking, then icons A, B, E and F are selected by box selection and then icons C and F are selected by clicking, an order of the icons to be overlapped which have been reordered and displayed is ABEFC (icons selected repeatedly is displayed once according to the order for which it is selected for the first time). At this point, the icons selected by clicking are overall prior to the icons selected by box selection in the order. If icons A, B, E and F are first selected by box selection and then the icons A, C and F are selected by clicking, and an order of the icons to be overlapped which have been reordered and displayed is ABEFC. At this point, the icons selected by box selection are overall prior to the icons selected by clicking in the order. Other ordering modes can be obtained by the same token, which are not described repeatedly.

In step S102, it is to set tags for the icons to be overlapped which have been reordered and displayed.

Figure 4:
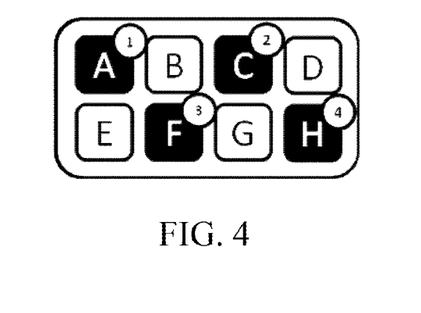
FIG. 4 is a schematic diagram of an interface for generating tags of the icons according to the embodiment of the present document.

The method for setting the tags are as followings: setting a default tag for a first icon of the icon to be overlapped; setting tags of middle icons according to an arranging order of the icons; and setting a tag of a last icon by default according to a last tag of the middle icons. As shown in FIG. 4, it is to set four tags for ordered eight icons to be overlapped A, B, C, D, E, F, G and H, and the tags are represented by numbers ①, ②, ③ and ④. The tags are used to space the icons to be overlapped, at this point, the default tag ① is set for the first icon A, the tags ② and ③ are set for the middle icons C and F, and the tag of the last icon H is set as ④ by default. The default tag set for the first icon A is indicated by the first tag, that is, tag ① in the embodiment. The default tag of the first icon cannot be canceled. The tags of the middle icons C and F are set as ② and ③ according to the arranging order of C and F. At this point, since the arranging order of C is prior to F, even if it is to select icon F firstly and then select icon C, the tag of icon F is still set as ③, and the tag of icon C is still set as ②. At this point, the tag of the last icon H will be set by default according to the tag of icon F, that is, the tag ④ is set by fault according to the tag ③. The tags ①, ②, ③ and ④ in the embodiment can be replaced by letters and graphs, the number of tags which are set for icons is not limited, but it cannot exceed the total number of the icons to be overlapped, that is, it can set 8 tags at most in the embodiment. Moreover, it can cancel the current setting by clicking the tags ② and ③ of the icons C and F in the embodiment, and after the setting is canceled, it is to make a corresponding adjustment for the rest of tags. For example, it is to click the tag ② of the icon C to cancel the current setting, the tag of the icon F can be adjusted as ②, and the tag of the last icon H can be can be adjusted as ③. It should be illustrated that, it is merely convenient for description to set the middle tags ② and ③ on the icons C and F in this embodiment, in the practical application, it can set the tags ② and ③ on any two tags except the first and last icons according to the actual demand. In addition, all the methods for setting the tags on the icons in the embodiment of the present document can be achieved by clicking the tags, since the method belongs to the related art, it will not be described repeatedly.

In step S103, it is to generate a new icon and display or hide the tags around the new icon.

The generated new icon is a preset icon (which can be same or not same with the icons to be overlapped) or a user-defined icon (such as a photograph or a downloaded illustration).

Figure 5:
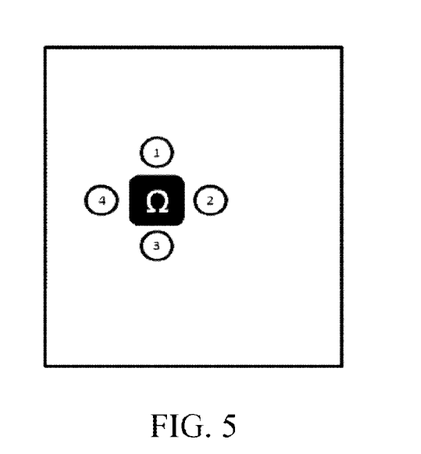
FIG. 5 and FIG. 9 are schematic diagrams of an interface for displaying the icons according to the embodiment of the present document.

When the tags are displayed around the new icon, a tag displaying method comprises: taking a specified location as a start point, arranging the tags clockwise or anticlockwise around the generated new icon uniformly. As shown in FIG. 5, assuming that a new icon Ω is generated and tags ①, ②, ③ and ④ are displayed around Ω, at this point, the upper side of the new icon Ω can be taken as a specified location and a start point, the tags ①, ②, ③ and ④ are arranged uniformly around the new icon Ω in a clockwise direction. Of course, the specified location in the embodiment can be any direction of the new icon.

Figure 6:
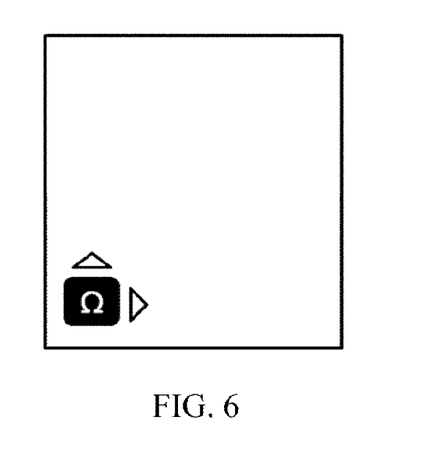
FIG. 6 and FIG. 10 are schematic diagrams of an interface for displaying an indication flag according to the embodiment of the present document.
Figure 7:
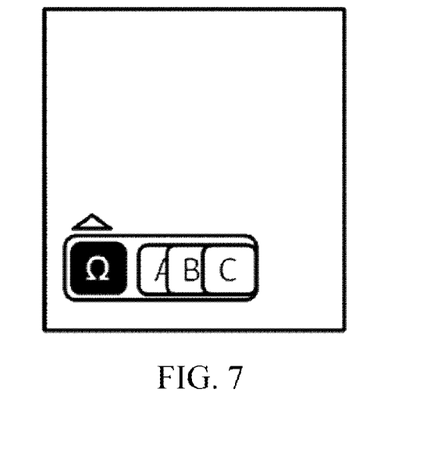
FIG. 7 and FIG. 11 are schematic diagrams of an interface for displaying icons between two tags according to the embodiment of the present document.

In the process of applying the above set new icon and tags, it is to click any two tags of the tags, and generate a new indication flag according to the space location where the new icon is located, and display all icons between the two selected tags after clicking or dragging the indication flag. As shown in FIG. 6 and FIG. 7, assuming that it is to click two tags ① and ② of tags ①, ②, ③ and ④, and the new icon Ω is placed in the lower left corner of the screen, there is a space in the new icon Ω to display the direction of the icons between the tag ① and the tag ② and generate the indication flag, that is, it is to generate a triangle indication flag on the upper side and right side of the new icon Ω respectively. Clicking or dragging any one of two triangle indication flags (it is the indication flag on the right side in the figure) can display all icons A, B, C between two clicked tags ① and ②. All of icons A, B, C can be displayed or icons A, B, C can be overlapped for display according to the size of space on the right side of the new icon Ω. It should be illustrated that, the new icon Ω in the embodiment can be located in any blank location of the screen where the icons can be placed. Moreover, a shape of the indication flag is not limited. In the practical application, any two of the tags ①, ②, ③ and ④ are clicked according to the demand, the new icon Ω can be placed in any location of screen where there is a space. The indication flags can be generated in all four directions on the upper side, lower side, left side and right side, and any one of the indication flags is clicked or dragged, and all the tags can be displayed or the tag can be overlapped for display according to the size of the space in the indication direction.

Embodiment 2

FIG. 1 is a flow chart of a method for setting icons of a mobile terminal according to the embodiment 2 of the present document, the method comprises the following steps.

In step S101, it is to select icons to be overlapped, arrange and display the icons to be overlapped according to a predetermined ordering rule.

When the icons to be overlapped are selected only by clicking, the predetermined ordering rule is an order of selecting the icons by clicking; when the icons to be overlapped are selected only by box selection, the predetermined ordering rule is that a left side of the icons selected by box selection is prior to a right side, an upper side is prior to a lower side; when selecting by clicking and selecting by box selection exist at the same time, the predetermined ordering rule is: within selecting modes, the icons are arranged according to respective predetermined ordering rules of the selecting modes; between the selecting modes, the icons are arranged according to an order of the selecting modes. As shown in FIG. 2 and FIG. 3, when the icons to be overlapped are selected only by clicking, it is to click icons A, F, C in sequence, an order of the icons to be overlapped which have been reordered and displayed is AFC; when the icons to be overlapped are selected only by box selection, icons A, B, E and F are selected by box selection, and an order of the icons to be overlapped which have been reordered and displayed is ABEF. When selecting by clicking and selecting by box selection exist at the same time, the predetermined ordering rule is that, if icon A is first selected by clicking, then icons A, B, E, F are selected by box selection, then icons C, F are selected by clicking, an order of the icons to be overlapped which have been reordered and displayed is ABEFC (icons selected repeatedly is displayed once according to the order for which it is selected for the first time), at this point, the icons selected by clicking are overall prior to the icons selected by box selection in the order; if icons A, B, E, F are first selected by box selection, then the icons A, C, F are selected by clicking, and an order of the icons to be overlapped which have been reordered and displayed is ABEFC, at this point, the icons selected by box selection are overall prior to the icons selected by clicking in the order. Other ordering modes can be obtained by the same token, which are not described repeatedly.

In step S102, it is to set tags for the icons to be overlapped which have been reordered and displayed.

The method for setting the tags are as followings: setting a default tag for a first icon of the icon to be overlapped; setting tags of middle icons according to an arranging order of the icons; and setting a tag of a last icon by default according to a last tag of the middle icons. As shown in FIG. 4, it is to set four tags for ordered eight tags to be overlapped A, B, C, D, E, F, G, H, and the tags are represented by numbers ①, ②, ③ and ④, the tags are used to space the icons to be overlapped, at this point, a default tag ① is set for the first icon A, tags ② and ③ are set for the middle icons C and F, and a tag of the last icon H is set as ④ by default. The default tag set for the first icon A is indicated by the first tag, that is, tag ① in the embodiment. The default tag of the first icon cannot be canceled. The tags of the middle icons C and F are set as ② and ③ according to the arranging order of C and F F, at this point, since the arranging order of C is prior to F, even if it is to select icon F firstly and then select icon C, the tag of icon F is still set as ③, and the tag of icon C is still set as ②. At this point, the tag of the last icon H will be set by fault according to the tag of icon F, that is, tag ④ is set by fault according to tag ③. The tags ①, ②, ③ and ④ in the embodiment can be replaced by letters and graphs, the number of tags which are set for icons is not limited, but it cannot exceed the total number of the icons to be overlapped, that is, it can set 8 tags at most in the embodiment. Moreover, it can cancel the current setting by clicking the tags ② and ③ of the icons C and F in the embodiment, after the setting is canceled, it is to make a corresponding adjustment for the rest of tags. For example, it is to click the tag ② of the icon C to cancel the current setting, the tag of the icon F can be adjusted as ②, and the tag of the last icon can be can be adjusted as ③. It should be illustrated that, it is merely convenient for description to set the middle tags ② and ③ on the icons C and F in this embodiment, in the practical application, it can set the tags ② and ③ on any two tags except the first and last icons according to the actual demand. In addition, all the methods for setting the tags on the icons in the embodiment of the present document can be achieved by clicking the tags, since the method belongs to the related art, it will be not described repeatedly.

In step S103, it is to generate a new icon and display or hide the tags around the new icon.

The generated new icon is a preset icon (which can be same or not same with the icons to be overlapped) or a user-defined icon (such as a photograph or a downloaded illustration).

Figure 8:
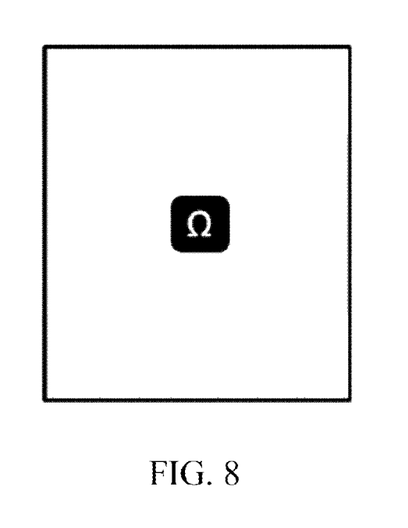
FIG. 8 is a schematic diagram of an interface for generating an new icon and hiding the tag according to the embodiment of the present document.
Figure 9:
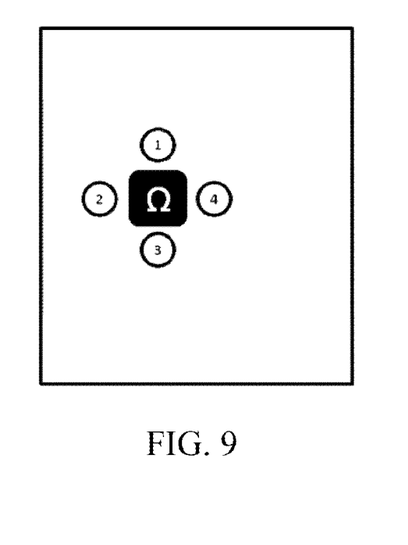

When the tags are hidden around the new icon, it is to click the new icon and then display the tags. A tag displaying method comprises: taking a specified location as a start point, arranging the tags anticlockwise around the generated new icon uniformly. As shown in FIG. 8, it is to generate the new icon Ω and hide the tags ①, ②, ③ and ④ around Ω. As shown in FIG. 9, it is to display the tags ①, ②, ③ and ④ around Ω after clicking the new icon Ω. At this point, the upper side of the new icon Ω can be taken as a specified location and a start point, the tags ①, ②, ③ and ④ are arranged uniformly around the new icon Ω in a anticlockwise direction. Of course, the specified location in the embodiment can be any direction of the new icon.

Figure 10:
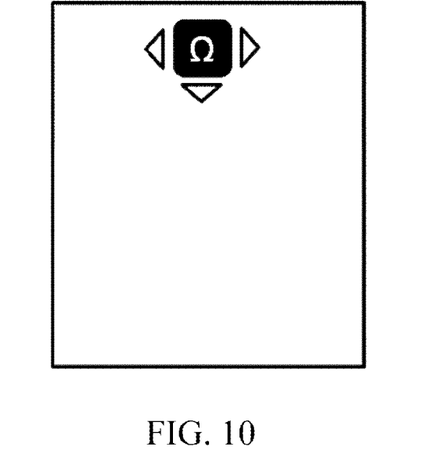
Figure 11:
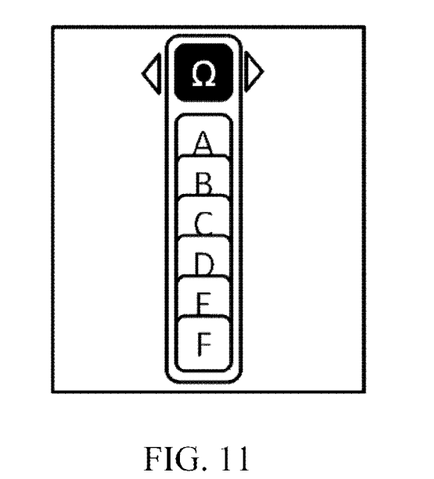

In the process of applying the above set new icon and tags, it is to click any two tags of the tags, generate a indication flag according to a space location where the new icon is located, and display all tags between the two selected tags after clicking or dragging the indication flag. As shown in FIG. 10 and FIG. 11, assuming that it is to click two icons ① and ③ of tags ①, ②, ③ and ④, and the new icon Ω is placed on the top of the screen, there is a space in the new icon Ω to display the direction of the icons between the tag ① and the tag ③ and generate the indication flag, that is, it is to generate a triangle indication flag on the lower side, left side and right side of the new icon Ω respectively. Clicking or dragging any one of three triangle indication flags (it is the indication flag on the lower side in the figure) can display all icons A, B, C, D, E and F between two selected tags ① and ③. All icons A, B, C, D, E, F can be displayed or icons A, B, C, D, E, F can be overlapped to display according to the size of space on the lower side of the new icon Ω. It should be illustrated that, the new icon Ω in the embodiment can be located in any blank location of the screen where the icons can be placed. Moreover, the shape of the indication flag is not limited. In the practical application, any two of the tags ①, ②, ③ and ④ are clicked according to the demand, the new icon Ω can be placed in any location where there is a space, the indication flags can be generated in all four directions on the upper side, lower side, left side and right side, any one of the indication flags is clicked or dragged, and all the tags can be displayed or the tag can be overlapped to display according to the size of space in the indication direction.

Embodiment 3

Figure 12:
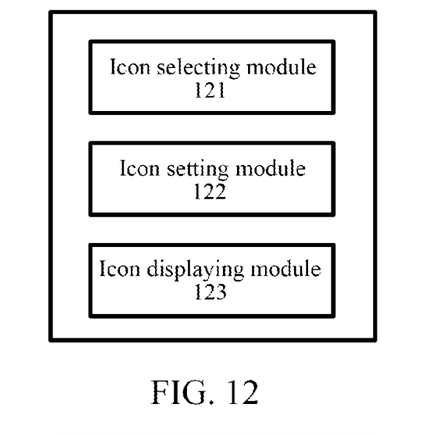
FIG. 12 is a schematic diagram of a device for setting icons of a mobile terminal according to the embodiment of the present document.

FIG. 12 is a schematic diagram of a device for setting icons of a mobile terminal according to the embodiment 3 of the present document, the device comprises: an icon selecting module 121, configured to select icons to be overlapped, arrange and display the icons to be overlapped according to a predetermined ordering rule; a tag setting module 122, configured to set tags for the icons to be overlapped which have been reordered and displayed; and an icon displaying module 123, configured to generate a new icon and display or hide the tags around the new icon.

Figure 13:
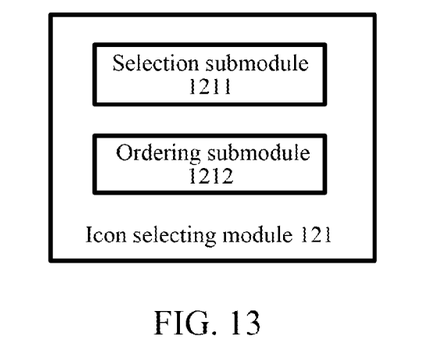
FIG. 13 is a schematic diagram of structure of an icon selecting module of the device according to the embodiment of the present document.

FIG. 13 is a schematic diagram of the icon selecting module 121 of the device according to the embodiment of the present document, the icon selecting module 121 comprises: a selection submodule 1211, configured to select the icons to be overlapped by clicking or by box selection; and an ordering submodule 1212, configured to arrange and display the icons to be overlapped according to the predetermined ordering rule.

Figure 14:
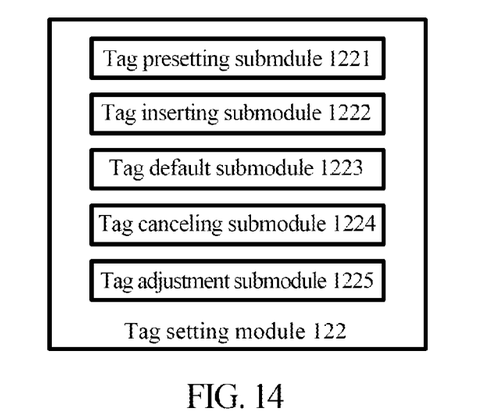
FIG. 14 is a schematic diagram of structure of a tag setting module of the device according to the embodiment of the present document.

FIG. 14 is a schematic diagram of the tag setting module 122 of the device according to the embodiment of the present document, and the tag setting module 122 comprises: a tag presetting submodule 1221, configured to set a default tag for a first icon of the icon to be overlapped; a tag inserting submodule 1222, configured to set tags for middle icons according to an arranging order of the icons; a tag default submodule 1223, configured to set a tag of a last icon by default according to a last tag of the middle icons; a tag canceling submodule 1224, configured to cancel setting of the tag by means of clicking the tags of the middle icons; and a tag adjustment submodule 1225, configured to make a corresponding modification to a tag next to the canceled tag.

Figure 15:
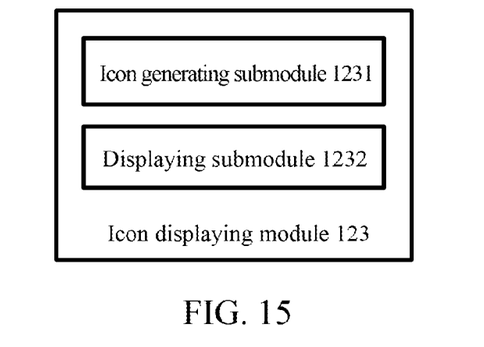
FIG. 15 and FIG. 16 are schematic diagrams of structure of an icon displaying module of the device according to the embodiment of the present document.

FIG. 15 is a schematic diagram of the icon displaying module 123 of the device according to the embodiment of the present document, and the icon displaying module 123 comprises: an icon generating submodule 1231, configured to generate a new icon; and a displaying submodule 1232 is configured to display the tags around the new icon.

Figure 16:
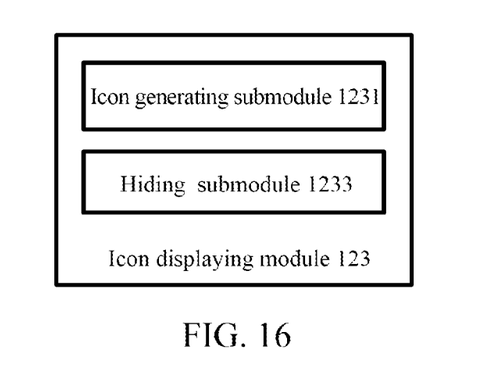

FIG. 16 is a schematic diagram of the icon displaying module 123 of the device according to the embodiment of the present document, and the icon displaying module 123 comprises: an icon generating submodule 1231, configured to generate a new icon; and a hiding submodule 1233, configured to hide the tags around the new icon.

Figure 17:
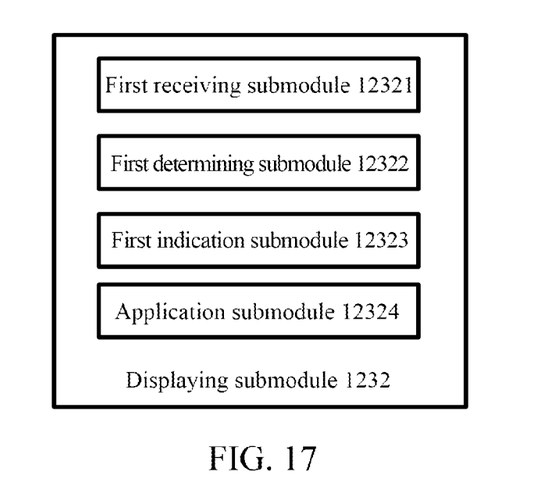
FIG. 17 is a schematic diagram of structure of a displaying submodule of the device according to the embodiment of the present document.

FIG. 17 is a schematic diagram of the displaying submodule 1232 of the icon displaying module 123 of the device according to the embodiment of the present document, and the displaying submodule 1232 comprises: a first receiving submodule 12322, configured to receive clicking information for the tags in the displaying submodule 1232; a first determining submodule 12322, configured to select and click any two tags of the tags in the displaying submodule 1232; a first indication submodule 12323, configured to generate an indication flag according to a space location where the new icon is located; and an application submodule 12324, configured to receive a clicking operation for the indication flag in the first indication submodule 12323, and display all icons or display overlapped icons between any two tags in the first determining submodule 12322.

Figure 18:
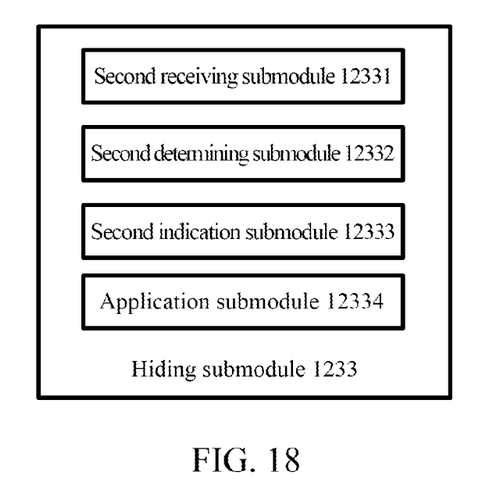
FIG. 18 is a schematic diagram of structure of a hiding submodule of the device according to the embodiment of the present document.

FIG. 18 is a schematic diagram of the hiding submodule 1233 of the icon displaying module 123 of the device according to the embodiment of the present document, the hiding submodule 1233 comprises: a second receiving submodule 12331, configured to receive clicking for the new icon and display the tags around the new icon; a second determining submodule 12332, configured to click and select any two tags of the tags in the second receiving submodule 12331; a second indication submodule 12333, configured to generate an indication flag according to a space location where the new icon is located; and an application submodule 12334, configured to receive a clicking operation for the indication flag in the second indication submodule 12333, and display all icons or display overlapped icons between any two tags in the second determining submodule 12332.

Obviously, those skilled in the art should understand that, each above module or each above step of the present document can be achieved with the general-purpose computing device, and the modules or steps can be integrated in a single computing device, or distributed to a network composed of multiple computing devices; optionally, they can be implemented with program codes executable by the computing device, thus, they can be stored in a storage device to be executed by the computing device, or they are made into separate integrated circuit modules respectively, or some modules or steps of them can be implemented as a single integrated circuit module. Therefore, the present document is not limited to any specific combination of hardware and software.

The above description is only the preferred embodiments of the present document and is not intended to limit the present document. For those skilled in the art, the embodiments of the present document can have various modifications and variations. Any modification, equivalent substitution, improvement etc., which is made within the spirit and principle of the embodiments of the present document, should be included in the protection scope of the appended claims of the present document.

INDUSTRIAL APPLICABILITY

The technical scheme of the embodiment of the present document can make the mobile terminal to find the application software quickly and accurately in a large number of the icons on the screen, and make the limited screen space to display more icons.

What we claim is:
1. A method for setting icons of a mobile terminal, comprising:
    selecting icons to be overlapped and arranging and displaying the icons to be overlapped according to a predetermined ordering rule;
    setting tags for the icons to be overlapped which have been reordered and displayed; and
    generating a new icon and displaying or hiding the tags around the new icon;
    the method further comprising:
    when the tags are displayed around the new icon,
    when clicking any two tags of the tags;
    generating an indication flag according to a space location where the new icon is located; and
    after clicking or dragging the indication flag, displaying all icons between the selected two tags.
2. The method of claim 1, wherein,
    said selecting icons to be overlapped comprises: selecting the icons to be overlapped by clicking and/or by box selection.
3. The method of claim 2, wherein,
    when the icons to be overlapped are selected only by clicking, the predetermined ordering rule is an order of selecting icons by clicking;
    when the icons to be overlapped are selected only by box selection, the predetermined ordering rule is that a left side of the icons selected by box selection is prior to a right side and an upper side is prior to a lower side; or
    when selecting by clicking and selecting by box selection exist at the same time, the predetermined ordering rule is that, within selecting modes, the icons are arranged according to respective predetermined ordering rules of the selecting modes; between the selecting modes, the icons are arranged according to an order of the selecting modes.

4. The method of claim 1, wherein,
said setting tags for the icons to be overlapped which have been reordered and displayed comprises:
setting a default tag for a first icon of the icons to be overlapped;
setting tags of middle icons according to an arranging order of icons; and
setting a tag of a last icon by default according to a last tag of the middle icons.

5. The method of claim 4, wherein,
said setting tags for the icons to be overlapped which have been reordered and displayed comprises:
canceling setting of the tag by means of clicking the tags of the middle icons, making a corresponding modification to a tag next to the canceled tag.

6. The method of claim 5, wherein,
the tags can be letters, numbers or graphics, and the tags are used to space the icons to be overlapped which have been reordered and displayed.

7. The method of claim 1, wherein,
the generated new icon is any one of a preset icon or a user-defined icon.

8. The method of claim 1, wherein,
said displaying the tags around the new icon comprises:
taking a specified location as a start point, arranging the tags clockwise or anticlockwise around the generated new icon uniformly.

9. The method of claim 1, further comprising: when the tags are hidden around the new icon, clicking the new icon and then displaying the tags around the new icon;
clicking any two tags of the tags;
generating an indication flag according to a space location where the new icon is located; and
after clicking or dragging the indication flag, displaying all icons between the selected two tags.

10. The method of claim 9, wherein,
said displaying the tags around the new icon comprises:
taking a specified location as a start point, arranging the tags clockwise or anticlockwise around the generated new icon uniformly, then displaying the tags around the generated new icon.

11. The method of claim 9, wherein,
said after clicking or dragging the indication flag, displaying all icons between the selected two tags comprises:
after clicking or dragging the indication flag, displaying all icons or displaying overlapped icons according to the number of icons between the two tags and the size of space in the direction of the indication flag.

12. A device for setting icons of a mobile terminal, comprising:
an icon selecting module, configured to select icons to be overlapped, arrange and display the icons to be overlapped according to a predetermined ordering rule;
an icon setting module, configured to set tags for the icons to be overlapped which have been reordered and displayed; and
an icon displaying module, configured to generate a new icon and display or hide the tags around the new icon;
wherein when the tags are displayed around the new icon, when any two tags of the tags are clicked, an indication flag is generated according to a space location where the new icon is located; and
after the indication flag is clicked or dragged, all icons between the selected two tags are displayed.

13. The device of claim 12, wherein, the icon selecting module comprises:
a selection submodule, configured to select the icons to be overlapped by clicking or by box selection; and
an ordering submodule, configured to arrange and display the icons to be overlapped according to the predetermined ordering rule.

14. The device of claim 12, wherein, the tag setting module comprises:
a tag presetting submodule, configured to set a default tag for a first icon of the icon to be overlapped;
a tag inserting submodule, configured to set tags for middle icons according to an arranging order of icons;
a tag default submodule, configured to set a tag of a last icon by default according to a last tag of the middle icons;
a tag canceling submodule, configured to cancel setting of the tag by means of clicking the tags of the middle icons; and
a tag adjustment submodule, configured to make a corresponding modification to a tag next to the canceled tag.

15. The device of claim 12, wherein, the icon displaying module comprises:
an icon generating submodule, configured to generate a new icon; and
a displaying submodule or a hiding submodule, wherein, the displaying submodule is configured to display the tags around the new icon; the hiding module is configured to hide the tags around the new icon.

16. The device of claim 15, wherein, when the icon displaying module comprises the displaying submodule, the displaying submodule comprises:
a first receiving submodule, configured to receive clicking information for the tags in the displaying submodule;
a first determining submodule, configured to click and select any two tags of the tags in the displaying submodule; and
a first indication submodule, configured to generate an indication flag according to a space location where the new icon is located.

17. The device of claim 15, wherein, the icon displaying module comprises the hiding submodule, the hiding submodule comprises:
a second receiving submodule, configured to receive clicking for the new icon and display the tags around the new icon;
a second determining submodule, configured to click and select any two tags of the tags in the second receiving submodule; and
a second indication submodule, configured to generate an indication flag according to a space location where the new icon is located.

18. The device of claim 16, wherein,
the displaying submodule further comprises: an application submodule, configured to receive a clicking operation for the indication flag in the first indication submodule, and display all icons or display overlapped icons between any two tags in the first determining submodule; and
the hiding submodule further comprises: an application submodule, configured to receive a clicking operation for the indication flag in the second indication submodule, and display all icons or display overlapped icons between any two tags in the second determining submodule.

19. The device of claim 17, wherein,
the displaying submodule further comprises: an application submodule, configured to receive a clicking operation for the indication flag in the first indication submodule, and display all icons or display overlapped icons between any two tags in the first determining submodule; and the hiding submodule further comprises: an application submodule, configured to receive a clicking operation for the indication flag in the second indication submodule, and display all icons or display overlapped icons between any two tags in the second determining submodule.

20. The device of claim 12, wherein, displaying the tags around the new icon comprises:

taking a specified location as a start point, arranging the tags clockwise or anticlockwise around the generated new icon uniformly.

* * * * *